April 5, 1966 H. F. HALL 3,244,823
ROTARY SWITCH WITH AXIAL AND ROTATIONAL DISPLACEABLE CONTACT STRUCTURE
Filed June 18, 1964 3 Sheets-Sheet 1

INVENTOR.
Howard F. Hall
By C. R. Meland
His Attorney

INVENTOR.
Howard F. Hall
By C. R. Meland
His Attorney

INVENTOR.
Howard F. Hall
By C. R. Meland
His Attorney

United States Patent Office 3,244,823
Patented Apr. 5, 1966

3,244,823
ROTARY SWITCH WITH AXIAL AND ROTATIONAL DISPLACEABLE CONTACT STRUCTURE
Howard F. Hall, Milwaukee, Wis., assignor to General Motors Corporation, Detroit, Mich., a corporation of Delaware
Filed June 18, 1964, Ser. No. 376,147
9 Claims. (Cl. 200—16)

This invention relates to electrical switches and more particularly to a random selection programmable rotary switch.

It is desirable in the use of sophisticated electronic equipment to be able to switch to various portions or components during the operation of the electronic gear. For example, in testing the operation of allied electronic circuits, it is necessary to test individual circuits and related electronic circuits having different voltage and amperage characteristics. It is obvious that, in the construction of complicated circuitry, it is sometimes necessary to have a single circuit perform different functions at various times in the operation of the electronic equipment with different attached pieces of electronic equipment. It is therefore necessary to be able to conductively engage a single circuit with several other circuits or several circuits with several other circuits, some of the aforementioned circuits being tested once or twice in a given test sequence. At present, rotary switches are sometimes unsatisfactory for this type circuit interconnection because the rotary motion of the selecting switch contact will sometimes pass over non-desired positions on its way to a selected position. During this movement of the contact, it is possible to impose higher voltages on circuit components than either the circuits or testing equipment connected thereto can withstand. Therefore, several switches are required in this type installation.

Another problem associated with certain electronic circuitry is the incorporation of a switch into a test pattern which has terminals that are adapted to be permanently engaged, for example, by soldering. If a change is incorporated into a test pattern, it becomes necessary to break the soldered connection and establish a new connection. It is likewise a requirement for certain electrical switches that a multitude of switching positions be available, sometimes as high as one hundred, at the same time having little space available for the mounting of a switch.

It is an object of the present invention to provide an improved rotary switch that, when rotated to a newly selected position, does not energize any undesirable positions along the way and will positively engage the desired circuits by a push-pull action of the switch.

It is another object of the present invention to provide an improved electrical switch that is very small in physical dimension and which can incorporate as high as one hundred twenty non-shorting switching positions within a dimensioned switch which heretofore has been capable of handling only fifty non-shorting positions.

It is still another object of the present invention to provide an improved rotary switch that has programmable decks that have the capability of quick circuit changes from a position external to the switch.

It is yet another object of the present invention to provide an improved rotary switch that can be mounted in a position testing a number of electronic circuits which has the capability of being reprogrammed or having added different electrical circuits without soldering connections and without moving the switch.

It is a further object of the present invention to provide an electrical rotary switch that can be freely rotated to randomly selected positions but will be non-rotatable as the selected position is electrically engaged.

It is still a further object of the present invention to provide an improved rotary switch that can be freely rotated to a selected position which is positively located and will energize any one of two series of electrical circuits from that selected position as an actuator is pushed or pulled.

It is yet a further object of the present invention to provide a random selection programmable rotary switch which can be rotated to a selected position without engaging any electrical circuits on its way to that position and which can be pushed or pulled to energize the selected series of electrical circuits in a manner that will positively locate the engaged circuits.

Further objects and advantages of the present invention will be apparent from the following description, reference being had to the accompanying drawings wherein preferred embodiments of the present invention are clearly shown.

In the drawings.

Figures 1, 2:
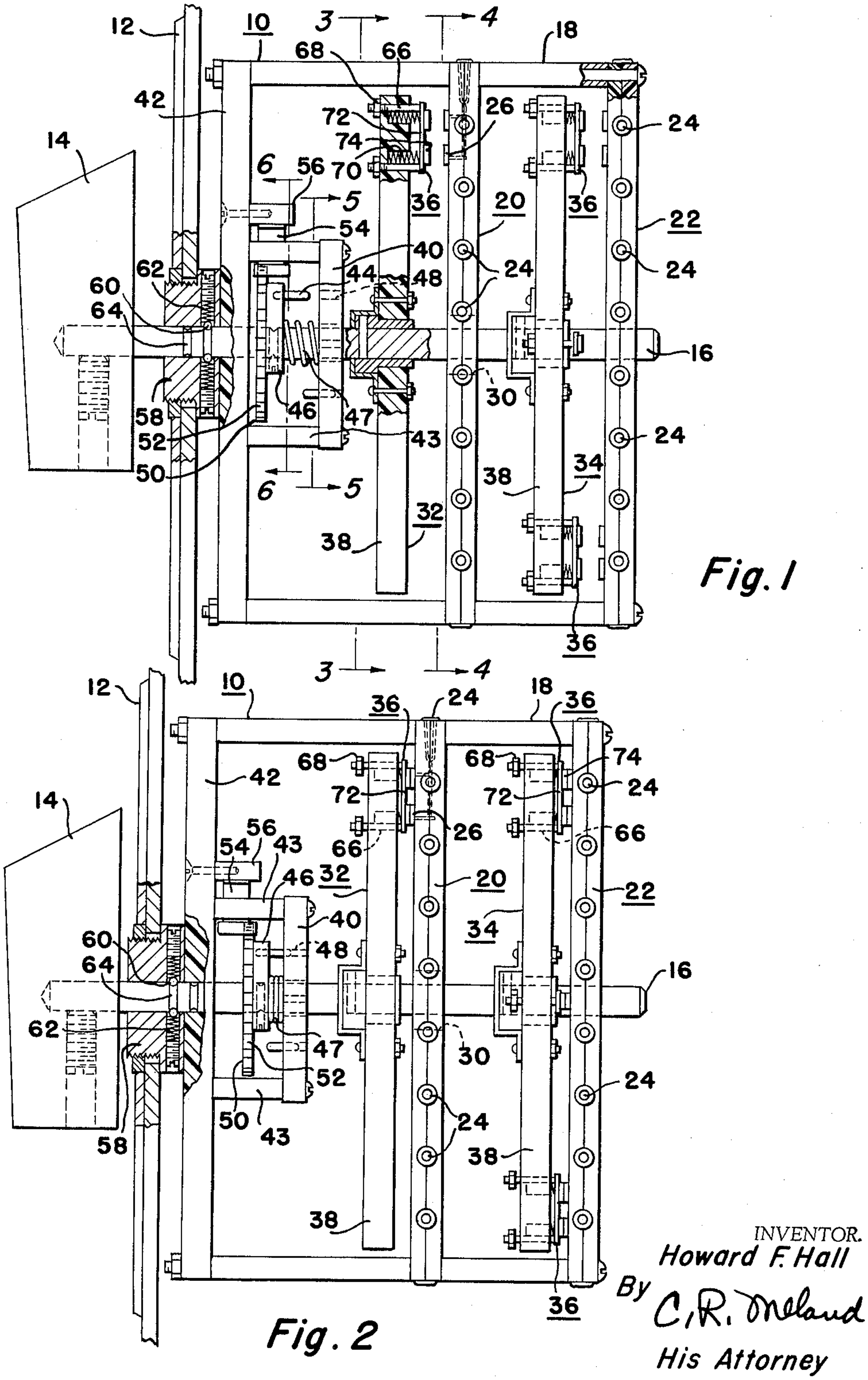
FIGURE 1 is a side elevation of one embodiment of the subject invention, the invention shown in a neutral position.
FIGURE 2 is a side elevation of the subject invention, the invention shown in an energized position.

Referring now to FIGURE 1, a rotary switch, generally designated by the numeral 10, is illustrated as being mounted through a panel 12 with a knob 14 carried by a rotatable shaft 16 being disposed on the opposite side of the panel from a main switch body 18. A pair of programmable decks 20 and 22 serve to provide support for the switch body 18 and include a plurality of sockets 24 disposed on the outer periphery of the programmable deck in a manner making them accessible to the outside of the switch body. The programmable decks 20 and 22 are substantially identical and are better illustrated in FIGURE 4.

Figures 4, 6:
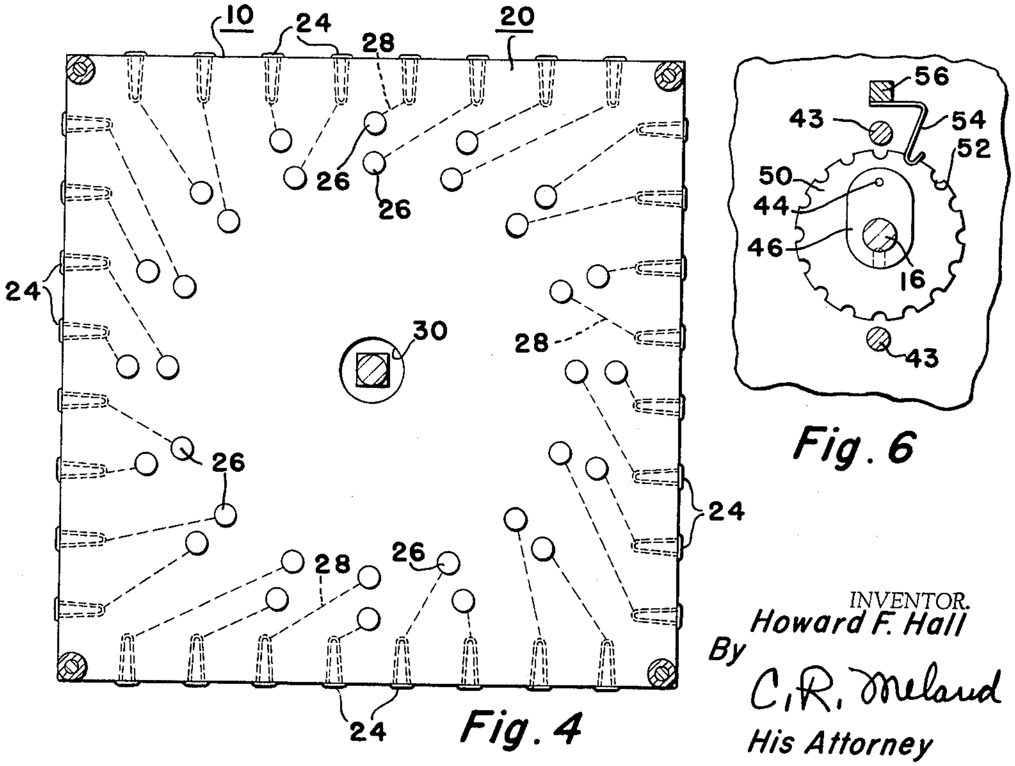
FIGURE 4 is a sectional view taken along line 4—4 of FIGURE 1.
FIGURE 6 is a sectional view taken along line 6—6 of FIGURE 1.

Referring to FIGURE 4, the sockets 24 are clearly shown around the complete periphery of the programmable deck 20 and are conductively engaging a series of contacts 26 through conductive elements 28. The contacts 26 are disposed on one surface of the programmable deck 20 and the conductive element 28 can be of any well-known conductive material, such as lead or silver, and may be of printed circuit construction. It is clear that the conductive elements 28 could also be wires or other conventional type leads. An aperture 30 in the center of the programmable board 20 provides an access for the rotatable shaft 16 and is disposed to remain fixed with respect to the shaft 16 as it rotates. As previously stated, the programmable decks 20 and 22 are identical and are herein referred to as fixed contact carrying means.

Referring now to FIGURE 1, a pair of movable contact carrying means 32 and 34 are carried by the shaft 16 and arranged to be non-rotatable with respect thereto. The broken away portion in FIGURE 1 illustrates a typical method of attaching the movable contact carrying means 32 or 34 to the shaft 16. It is understood that this can be accomplished in any well-known manner and the method illustrated is therefore illustrative only.

Figures 3, 5:
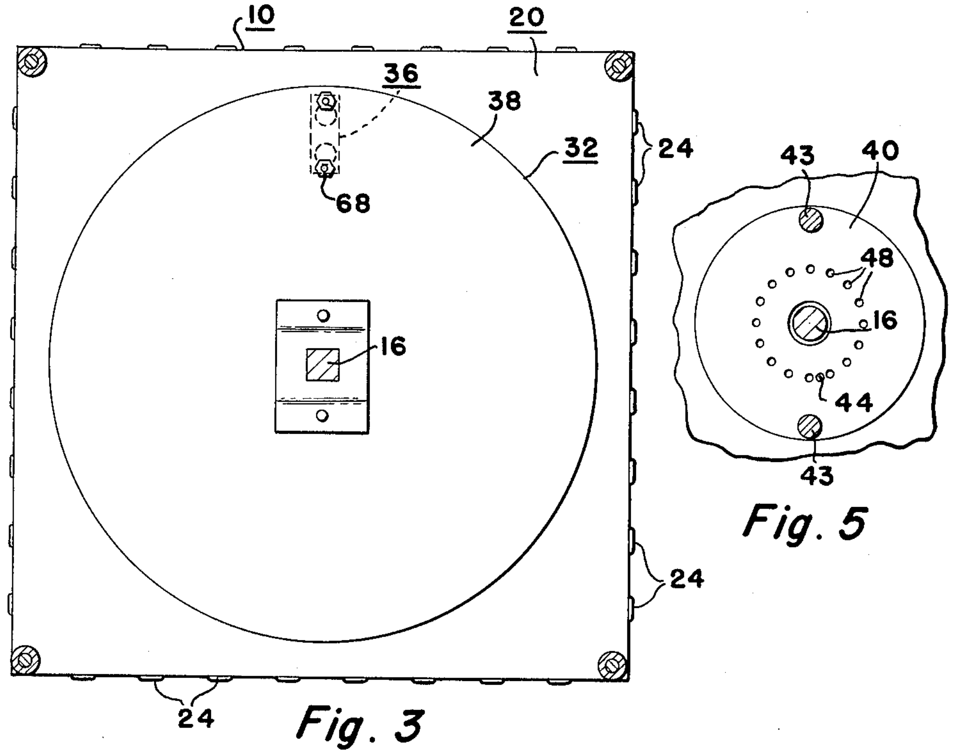
FIGURE 3 is a sectional view taken along line 3—3 of FIGURE 1.
FIGURE 5 is a sectional view taken along line 5—5 of FIGURE 1.

The contact carrying means 32 and 34 are better illustrated in FIGURE 3 wherein the general shape of the contact carrying means 32 is seen to be circular. A contact bridge 36 is disposed near the periphery of a bridge wafer 38 which forms the substantially disk-shaped portion of the contact carrying means 32. The bridge wafer 38 is of any well-known insulating material in the preferred form. It is obvious that the bridge wafer 38 can be of any rigid material if the bridge contacts 36 are insulated therefrom in their operative mounting. It is equally obvious that the bridge contact 36, illustrated in FIGURE 3, can be duplicated on the periphery of the bridge wafer 38 as many times as is desirable in a given installation so long as the orientation of the bridge contact 36 on the bridge wafer 38 generally corresponds to the spatial relation of the contacts 36 disposed on the face of the programmable decks 20 or 22. The movable contact means 34 is identical in shape and structure to the movable contact carrying means 32 except that, in a normal installation, at least four bridge contacts would be disposed on the face of the bridge wafer associated with that assembly. Again, it must be made clear that the exact number of bridge contacts disposed on the bridge wafer is determined by the requirements of the installation and the number shown in FIGURE 1 is illustrative only.

Referring now to FIGURE 1, a plate 40 is illustrated as being mounted in fixed relationship to a front wall 42 of the switch body 18 and is held in an operative position by legs 43. A pin 44 is carried by a member 46 which in turn is carried by the shaft 16 and in fixed relationship with respect thereto. A spring 47 serves to bias the member 46 away from the plate 40 and thus acts as a return means for the actuator. The pin 44 is adapted to cooperate with a series of apertures 48 disposed in a circular fashion in the plate 40. As the shaft 16 slides translationally during the operation of the switch, the pin 44 will engage one of the apertures 48 and prevents the shaft 16 from being rotatable while the bridge contacts 36 are engaging the fixed contacts 26. The cooperation of the pin 44 and the apertures 48 is hereinafter referred to as the holding means. The configuration of the plate 40 and associated parts is more clearly illustrated in FIGURE 5.

Referring now to FIGURE 1, a disk 50 having a series of peripherally spaced detents 52 is carried by the shaft 16 in fixed relationship with respect thereto and which corresponds to a radial position where the bridge wafers 38 are radially aligned in opposition to the fixed contacts 26. A resilient pawl member 54 is carried by a block 56 which in turn carried by the front wall 42 of the switch body 18 in any well-known manner. One end of the pawl 54 is engageable with any of the detents 52 and serves to resiliently lock the shaft 16 in several positions of rotary movement. This relationship of parts is more clearly seen in FIGURE 6 and is generally referred to herein as the locking means. It becomes therefore apparent that the shaft 16 can be rotated incrementally into a plurality of positions where the bridge contacts 36 will be aligned with the fixed contacts 26 and wherein the pin 44 will be aligned with one of the apertures 48. It is equally obvious that indicia can be placed on the face of the panel 12 where the knob 14 is disposed in a manner that would allow a portion of the knob 14 to point to an indicia on the panel 12 corresponding to a particular set of program circuits established by the engagement of a terminal from the external circuits and the sockets 24. The sockets 24 can therefore be programmed in any desired manner and the particular type of programming can be visually illustrated on the panel 12 where it can be randomly selected by a movement of the knob 14 in a rotary manner.

Referring now to FIGURE 1, a bearing block 58 is disposed through the panel 12 and is adapted to carry the shaft 16 for rotation therein. Drilled passages in the block 58 carry balls 60 biased toward the shaft 16 by springs 62. The balls 60 are arranged to cooperate with a series of peripheral grooves 64 formed in the shaft 16. The cooperation of the grooves 64 and the balls 60 provides an axial positioning means for the shaft 16 in that the location of one of the grooves 64 is adapted to cooperate with the balls 60 as the bridge contacts 36 engage the fixed contacts 26.

It should be noted that the bridge contacts 36 are attached to the movable contact carrying means 32 and 34 in a resilient manner which allows a certain amount of reciprocating movement of the bridge contacts 36 relative to the bridge wafer 38. An examination of the bridge contacts 36, as seen in FIGURE 1, illustrates a substantially U-shaped assembly 66 with the legs of the U extending through the bridge wafer 38 held by retainer 68 and biased away from the surface of the wafer 38 by springs 70. A conductive path is therefore established between the legs of the U by the conductive arm 72 carrying contacts 74.

In operation, the rotary switch 10 is mounted through a panel 12 in a manner accessible to an operator. The sockets 24 are female members adapted to engage male terminals from external electrical circuits. Any pattern desired may be established between the terminals and the sockets 24 and this programming can be checked by the operator rotating the knob 14 to a randomly selected rotary position which will correspond to the preset circuit hookup. It is clear that, during this initial rotation of the knob 14, the bridge contacts 36 are still spaced away from the fixed contacts 26 and, therefore, no circuits are energized. When the knob 14 indicates that a selected rotary position has been reached, the knob 14 carried by the shaft 16 is pressed into the switch body until one of the grooves 64 engage the ball 60. The switch is designed so that this occurs at substantially the same time that the contact 74 of the bridge contact 36 engages the fixed contacts 26. As previously stated, the locking means has provided a resilient stop after certain incremental rotary movements of the knob 14 and, when the shaft 16 is pushed into the switch body, the holding means will prevent further rotation of the switch. In this manner, so unselected positions are energized while moving from one selected position to another, thereby reducing the possibility of harmful voltages being applied to unselected circuits. It is obvious that the types and movements of circuits connected to the sockets 24 is limited only by the ingenuity of the operator or technician setting up the switch for operation.

The particular switch illustrated herein has certain established dimensions that are not critical and it is obvious that only the circuit loads and the exigencies of the particular installation will dictate the number of sockets that are disposed in the programmable decks and the number of bridge contacts that are to be used on the bridge wafer 38. It has been found that at least twice as many possible circuit attachments are possible with this switch than with any other rotary switch now in use.

After the circuits that have been selected for test or for operation are no longer desired to be engaged, the knob 14 is pulled until another of the grooves 64 engages the balls 60 and, in this way, the shaft 16 is positioned for another selection and engagement cycle.

Figures 7, 8:
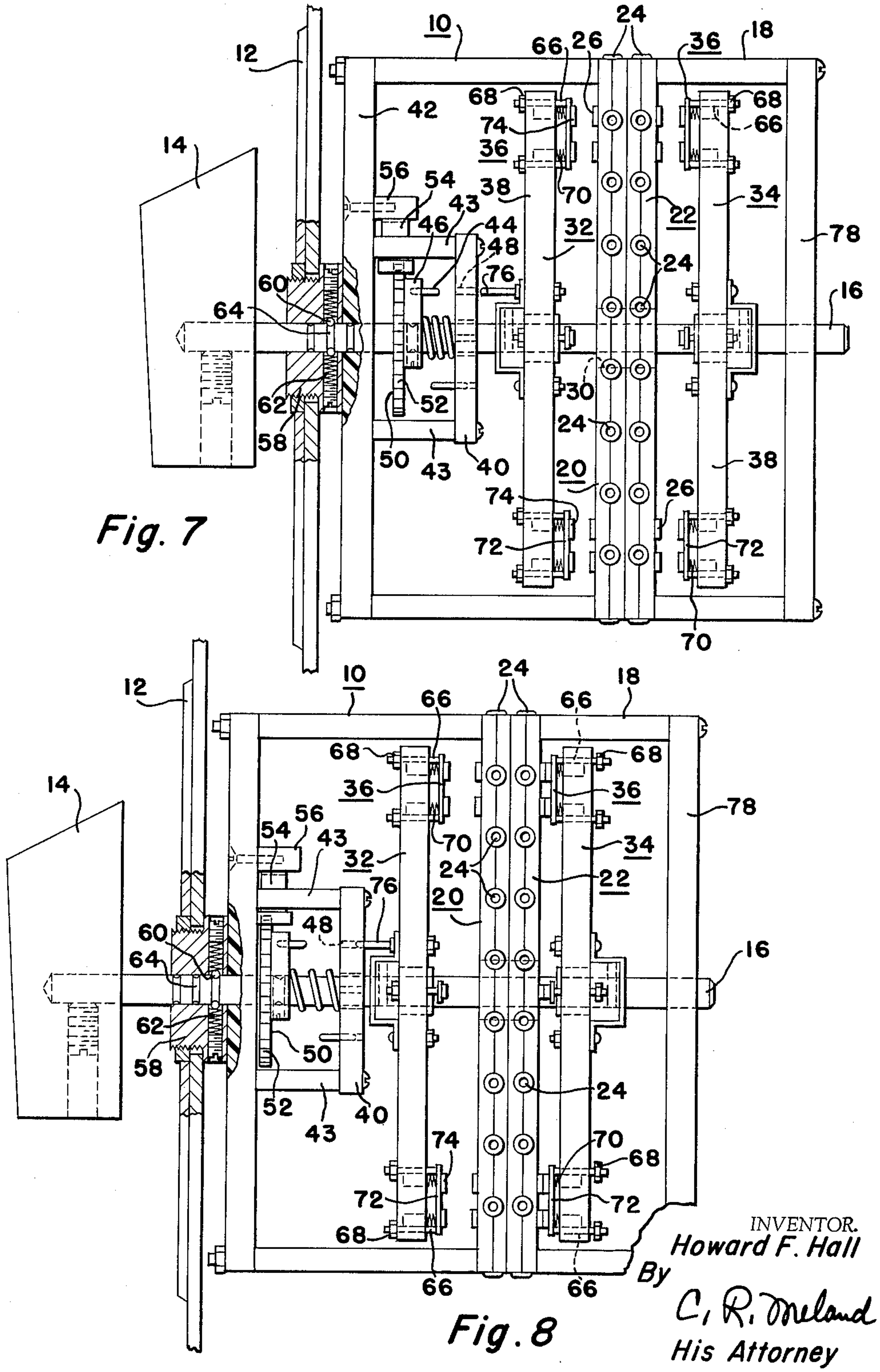
FIGURE 7 is a side elevation of another embodiment of the subject device with parts broken away, the device shown in a neutral position.
FIGURE 8 is a side elevation of the embodiment illustrated in FIGURE 7, the device shown in one of its actuated positions.

Referring now to FIGURE 7, another embodiment of the subject invention is illustrated. In a description of this embodiment, the reference numerals will remain the same for corresponding parts as used in the previous embodiment. In FIGURE 7, the programmable decks 20 and 22 are illustrated in back to back relationship to accommodate an actuator means that is pushed or pulled from a centered or neutral position. A pin 76, similar to the pin 44 in the previous embodiment, is carried by the movable contact carrying means 32 and is adapted to engage one of the apertures 48 in the plate 40 when the actuator knob is pulled to bring the movable contact carrying means 34 into engagement with the programmable deck 22. The other changes in this embodiment involve the addition of a third groove 64 to position the shaft 16 when the knob 14 is pulled and the addition of an end wall member 78.

In operation, the second embodiment of the invention is adapted to operate by being pushed and pulled from a central neutral position. The operative structure is identical with the previous embodiment except as hereinbefore noted. It becomes clear that the number of different rotary positions possible with this arrangement is doubled with a slight decrease in the number of programming arrangements possible in the cooperation of the bridge contacts and the fixed contacts. This embodiment has utility in an application where more rotary positions or incremental selection points are required and the number of sockets disposed in the programmable decks are sufficient to carry out the desired circuit connections. As previously stated, it is obvious that the number of sockets in the programmable deck could be increased and the switch designed in the holding means to provide an increased number of radial positions. The size of the switch would be limited only by the area available for the installation of the switch.

It is likewise evident from an examination of the drawings and the description that a sequencing switch having a plurality of programmable decks in any number of radial positions could readily be designed if the movable contact carrying means carried by the shaft were spring loaded in their mounted position to allow sequential engagement with an added number of programmable decks.

One of the most important aspects of the utility of the present invention is in its versatility. Different types of arrangements of parts have been illustrated in two embodiments specifically disclosed herein but it is clear that inventive concept residing in either of the embodiments could be expanded by anyone knowledgeable in the art to adapt the switch disclosed to more varied functions. An example of this versatility is the combination of the concept set forth in the first embodiment wherein the programmable decks are separated and the back to back relationship set forth in a second embodiment. It is obvious that increasing the length of the shaft and adding two more movable contact carrying means and programmable decks on either side of the embodiment shown in FIGURE 7 would bring about the advantages illustrated in the embodiment in FIGURE 1 as to number of possible circuit connections in addition to those illustrated in FIGURE 7.

While the embodiments of the present invention, as herein disclosed, constitute preferred forms, it is to be understood that other forms might be adopted.

What is claimed is as follows:

1. An electric switch comprising: actuator means rotatably mounted and disposed for sliding translational movement; holding means for preventing rotation of said actuator means during translational movement thereof; first contact carrying means carried by said actuator means and including a series of contact bridges disposed in a circular manner on one face of the first contact carrying means; and second contact carrying means including a series of contacts corresponding in spatial relation to the series of contact bridges and engaged thereby during translational movement of the actuator means, said second contact carrying means being fixed with respect to said first contact carrying means and having a series of conductive elements connecting said series of contacts and a series of sockets peripherally disposed on the edges of said second contact carrying means, said sockets adapting said second contact carrying means to be programmed to energize a different plurality of electrical circuits as said actuator means is rotated to a different axial position.

2. An electrical switch according to claim 1 wherein the holding means is at least one pin carried by the actuator means in fixed relationship therewith and extending in parallel relationship to the axis of said actuator means; and plate means having an aperture arranged to receive the actuator means during rotational and sliding movement thereof, said plate means including a series of circularly disposed apertures adapted to receive said pin carried by the actuator means during sliding translational movement thereof thereby preventing further rotational movement of the actuator means.

3. A rotary electrical switch adapted for random selection of programmed electrical circuits, said switch comprising: a switch body; actuator means including a shaft adapted for rotational and sliding translational movement on the axis of the shaft within said switch body, said actuator means including holding means for preventing rotational movement after sliding translational movement thereof has begun in one direction and positioning means for positively locating the actuator means in either extreme of sliding translational movement; movable contact carrying means carried by said shaft and including a series of contact bridges disposed in circular fashion on one face of said movable contact carrying means; and fixed contact carrying means carried by said switch body and including contacts carried in opposed juxtaposition to said contact bridges and engaged thereby as the actuator means is moved translationally to one extreme of sliding movement, said fixed contact carrying means having sockets carried on the outside of the switch body being in conductive relationship to said contacts, said sockets being adaptable for engagement with leads to electrical circuits that are programmed to carry out a multiplicity of functions, said actuator means being rotatable to a selected position while in one extreme of translational movement and thereafter slidable to another extreme of translational movement where the selected programmed circuits are energized.

4. A rotary electrical switch according to claim 3 wherein the conductive relationship of the contacts to the sockets is established by printed circuit means.

5. A rotary electrical switch according to claim 3 wherein the positioning means is a spring loaded ball slidably carried in a portion of the switch body and arranged to cooperate with a plurality of grooves peripherally disposed on a portion of the shaft whereby the shaft is positioned in a selected extreme of translational movement.

6. A rotary electrical switch adapted for random selection of programmed electrical circuits, said switch comprising: a switch body; actuator means carried by said switch body and having at least one portion extending therefrom and being manually engageable, said actuator means including a shaft rotatably disposed for incremental movement in said switch body and adapted for axial movement therein, said actuator including means for holding said shaft in several positions of rotational movement, means for holding said shaft in several positions of axial movement, and locator means for radially positioning said shaft after specific increments of rotational movement; movable contact carrying means including a wafer board having a plurality of bridge contacts disposed in circular fashion on at least one surface thereof, said movable contact carrying means being responsive to the actuator means for rotational and axial movement; and fixed contact carrying means carried by said switch body and having contacts disposed in juxtaposition to said bridge contacts and positioned on at least one side thereof in a circular pattern corresponding to the spatial disposition of the bridge contacts, said fixed contact carrying means including sockets conductively engaging said contacts and engaging with terminals from a plurality of external electrical circuits, said bridge contacts and contacts carried by the fixed contact carrying means being engageable in a plurality of randomly selected positions to energize a plurality of combinations of electrical circuits.

7. A rotary electrical switch according to claim 6 wherein the sockets are formed on an edge of said fixed contact carrying means and are thereby accessible for terminal engagement from the outside of the switch body.

8. A rotary electrical switch according to claim 6 wherein the locator means is a disc having detents formed on the outer periphery thereof and being carried by said shaft, and a resilient pawl member carried by a non-rotatable portion of the switch and arranged to cooperate with the detents formed on the outer periphery of the disc whereby resistance to rotation is felt on rotating the shaft through a position where the bridge contacts become aligned with a corresponding plurality of contacts carried by the fixed contact carrying means.

9. A rotary electrical switch according to claim 6 wherein the fixed contact carrying means is a board of insulating material having contacts formed on at least one surface thereof and sockets formed in at least one edge thereof, and conductive elements disposed between each of the sockets and a contact to provide a path for current flow therebetween.

References Cited by the Examiner

UNITED STATES PATENTS

| | | | |
|---|---|---|---|
| 1,895,306 | 1/1933 | Barrington. | |
| 2,696,535 | 12/1954 | McLean et al. | 339—193 |
| 2,938,987 | 5/1960 | Brown | 200—11 X |
| 3,104,299 | 9/1963 | Koci et al. | 200—11 X |
| 3,118,026 | 1/1964 | Pusch et al. | 200—16 |
| 3,121,143 | 2/1964 | Landry et al. | 200—11 |

KATHLEEN H. CLAFFY, *Primary Examiner.*

J. R. SCOTT, *Assistant Examiner.*